(12) United States Patent
Bellaton et al.

(10) Patent No.: US 7,886,113 B2
(45) Date of Patent: Feb. 8, 2011

(54) METHOD AND SYSTEM FOR MANAGING ACCESS TO A DATA ELEMENT IN A MULTITHREADED ENVIRONMENT

(75) Inventors: Gilles Bellaton, Saint Martin (FR); Karine Excoffier, Montbonnot (FR); Mark Craig, Barraux (FR)

(73) Assignee: Oracle America, Inc., Redwood City, CA (US)

( * ) Notice: Subject to any disclaimer, the term of this patent is extended or adjusted under 35 U.S.C. 154(b) by 439 days.

(21) Appl. No.: 11/591,196

(22) Filed: Oct. 31, 2006

(65) Prior Publication Data
US 2008/0104334 A1    May 1, 2008

(51) Int. Cl.
*G06F 12/08* (2006.01)

(52) U.S. Cl. .................. 711/141; 711/118; 711/144; 711/145

(58) Field of Classification Search .............. 711/141, 711/118, 144, 145
See application file for complete search history.

(56) References Cited

U.S. PATENT DOCUMENTS 7,162,587 B2 * 1/2007 Hiken et al. ................ 711/135
7,451,434 B1 * 11/2008 Blumenthal et al. ......... 717/116

OTHER PUBLICATIONS

*Copy on Write*, Jun. 28, 2005, http://c2.com/cgi/wiki?CopyOnWrite (1 page).

* cited by examiner

*Primary Examiner*—Sanjiv Shah
*Assistant Examiner*—Jae U Yu
(74) *Attorney, Agent, or Firm*—Osha • Liang LLP

(57) ABSTRACT

A method for managing access to a data element involves storing a first copy of the data element in a cache location, obtaining a request to modify the data element, where the request to modify the data element is associated with a first execution thread, marking the cache location as dirty based on the request to modify the data element, modifying the cache location according to the request to modify the data element once the cache location is marked as dirty, obtaining a request to read the data element while the cache location is marked as dirty, where the request to read the data element is associated with a second execution thread, providing a second copy of the data element in response to the request to read the data element based on the cache location being marked as dirty, and marking the cache location as clean after modifying the cache location is complete.

16 Claims, 6 Drawing Sheets

METHOD AND SYSTEM FOR MANAGING ACCESS TO A DATA ELEMENT IN A MULTITHREADED ENVIRONMENT

BACKGROUND

In modern computing, multithreading refers to concurrent management of multiple execution threads. The execution threads may be associated with a single software application, multiple software applications, or any combination thereof.

In a single-processor, single-core environment, only a single execution thread can be executed at any given time. However, a given execution thread may encounter a delay during which no execution is possible. For example, the execution thread may be awaiting user input, a network packet, storage device spin-up, etc. During such delays, another execution thread may be executed. In this manner, improved utilization of available processing resources is achieved.

Further, in a multi-processor or multi-core environment, multiple execution threads may be executed simultaneously. Simultaneous execution of multiple execution threads is referred to as parallel processing. Parallel processing generally allows multiple execution threads to be executed in a shorter period of time. However, the multiple execution threads may require access to the same system resource(s), such as memory, storage devices, network bandwidth, etc. In particular, in some cases, multiple execution threads may require access to the same data element (i.e., a data element stored in memory, persistent storage, etc.) at the same time.

If multiple execution threads are allowed to access a data element simultaneously, data inconsistency may result. For example, if one execution thread reads the data element while another execution thread is modifying the data element, the data that is read may be incomplete or corrupted. To avoid data inconsistency, lock mechanisms (e.g., semaphores, spin-locks, etc.) are typically used to allow only a single execution thread to access a data element at once. Specifically, a lock is obtained when an execution thread accesses a data element, and other execution threads are not allowed to read or modify the data element until the lock is released.

SUMMARY

In general, in one aspect, the invention relates to a method for managing access to a data element. The method involves storing a first copy of the data element in a cache location, obtaining a request to modify the data element, wherein the request to modify the data element is associated with a first execution thread, marking the cache location as dirty based on the request to modify the data element, modifying the cache location according to the request to modify the data element once the cache location is marked as dirty, obtaining a request to read the data element while the cache location is marked as dirty, wherein the request to read the data element is associated with a second execution thread, providing a second copy of the data element in response to the request to read the data element based on the cache location being marked as dirty, and marking the cache location as clean after modifying the cache location is complete.

In general, in one aspect, the invention relates to a system. The system includes a cache location storing a first copy of a data element, and a data manager configured to obtain a request to modify the data element, wherein the request to modify the data element is associated with a first execution thread, mark the cache location as dirty based on the request to modify the data element, modify the cache location according to the request to modify the data element once the cache location is marked as dirty, obtain a request to read the data element while the cache location is marked as dirty, wherein the request to read the data element is associated with a second execution thread, provide a second copy of the data element in response to the request to read the data element based on the cache location being marked as dirty, and mark the cache location as clean after modifying the cache location is complete.

In general, in one aspect, the invention relates to a computer readable medium. The computer readable medium includes executable instructions for managing access to a data element by storing a first copy of the data element in a cache location, obtaining a request to modify the data element, wherein the request to modify the data element is associated with a first execution thread, marking the cache location as dirty based on the request to modify the data element, modifying the cache location according to the request to modify the data element once the cache location is marked as dirty, obtaining a request to read the data element while the cache location is marked as dirty, wherein the request to read the data element is associated with a second execution thread, providing a second copy of the data element in response to the request to read the data element based on the cache location being marked as dirty, and marking the cache location as clean after modifying the cache location is complete.

Other aspects of the invention will be apparent from the following description and the appended claims.

DETAILED DESCRIPTION

Figure 1A:
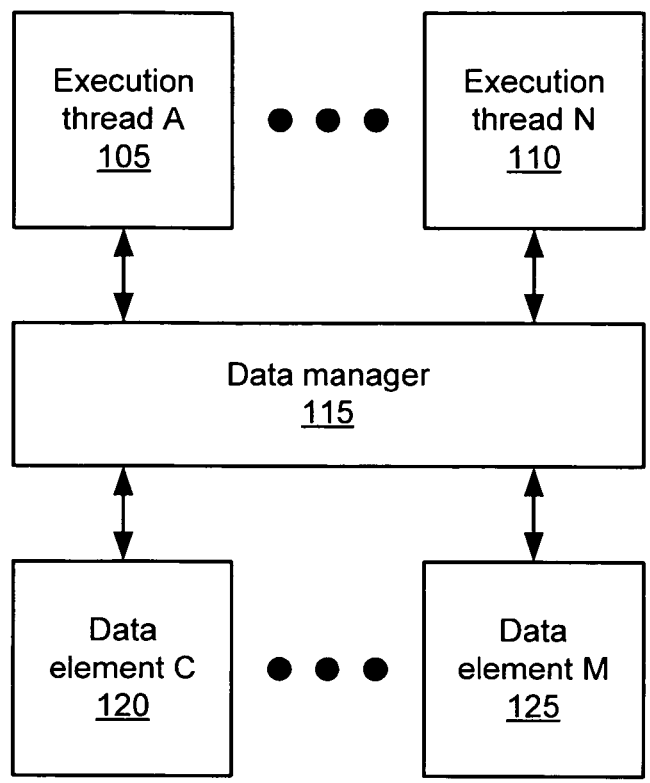
FIGS. 1A-1B show diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to manage access to a data element in a multithreaded environment. Specifically, embodiments of the invention provide a method and system for an execution thread to read a data element while another execution thread is modifying the data element.

FIG. 1A shows a diagram of a system in accordance with one or more embodiments of the invention. Specifically, FIG. 1A shows a multithreaded environment in accordance with one or more embodiments of the invention. In particular, the multithreaded environment includes multiple execution threads (e.g., execution thread A (105), execution thread N (110)) associated with multiple software applications, a single software application, or any combination thereof.

Further, the system shown in FIG. 1A includes a data manager (115) configured to manage access by the execution threads to one or more data elements (e.g., data element C (120), data element M (125)). Specifically, the data manager (115) is configured to obtain requests from the execution threads to read and/or modify the data element(s), and manage access to the data element(s) based on the requests. In one or more embodiments of the invention, the data manager (115) is an operating system, a file system, a volume manager, a device driver (e.g., a hard disk driver), a hardware device controller, or any other similar type of hardware and/or software module for managing access to the data element(s). In one or more embodiments of the invention, the data element (s) include textual data, numerical data, graphical data, video data, audio data, encrypted data, unstructured data, any other similar type of data, or any combination thereof. Further, the data element(s) may be stored in memory, on a hard disk, or at any other similar location.

Figure 1B:
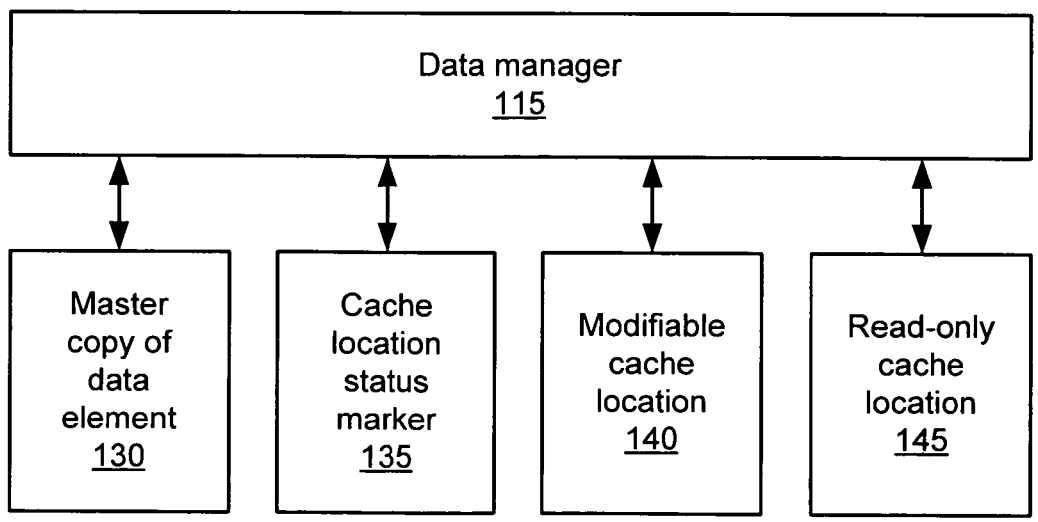

FIG. 1B shows a diagram of a system in accordance with one or more embodiments of the invention. Specifically, FIG. 1B shows a diagram of a data manager (115) configured to manage access to a data element in accordance with one or more embodiments of the invention. More specifically, to manage access to the data element, the data manager (115) maintains a master copy of the data element (130), a copy of the data element stored in a modifiable cache location (140), a copy of the data element stored in a read-only cache location (145), and a cache location status marker (135) indicating a status of the modifiable cache location (140).

In one or more embodiments of the invention, the master copy of the data element (130) is the definitive copy of the data element. Said another way, the master copy of the data element (130) provides a basis for subsequent copies of the data element, and modifications to the data element are ultimately written back to the master copy of the data element (130). For example, the copies of the data element stored in the cache locations (140, 145) may originate from the master copy of the data element (130). In one or more embodiments of the invention, the master copy of the data element (130) is stored in memory, on a hard disk, or at any other similar location. Further, the cache locations (140, 145) may be locations in memory, on a hard disk, or at any other similar location. In some cases, the cache locations (140, 145) may be locations providing faster data access than the master copy of the data element (130). In such cases, the use of cache locations (140, 145) may improve system performance by reducing the number of times the master copy of the data element (130) is accessed.

Those skilled in the art will appreciate that the terms "modifiable" and "read-only" refer here solely to the designated function of the cache locations (140, 145). Accordingly, no inherent limitations of the cache locations (140, 145) should be inferred from the use of the terms "modifiable" and "read-only" in this context. In one or more embodiments of the invention, using only a single modifiable cache location (140) for a data element eliminates the possibility of an execution thread reading a copy of the data element while the same copy is being modified by another execution thread. Accordingly, using only a single modifiable cache location (140) reduces the potential for reading incomplete or corrupt data.

In one or more embodiments of the invention, the cache location status marker (135) indicates whether the modifiable cache location (140) is currently being modified by an execution thread. Said another way, the cache location status marker (135) is effectively a locking mechanism that indicates whether the modifiable cache location (140) is "dirty" (i.e., currently locked by an execution thread) or "clean" (i.e., available for modification by an execution thread). In one or more embodiments of the invention, the cache location status marker (135) may be a Boolean variable, a toggle bit, or any other similar type of marker for differentiating between a dirty status and a clean status.

While the system shown in FIG. 1B has been discussed with respect to only a single data element, those skilled in the art will appreciate that one or more components of the system may be repeated for additional data elements. Specifically, the data manager (115) may be configured to manage access to multiple data elements, and accordingly may maintain master copies, cache location status markers, modifiable cache locations, and/or read-only cache locations for each of the data elements being managed.

Figure 2:
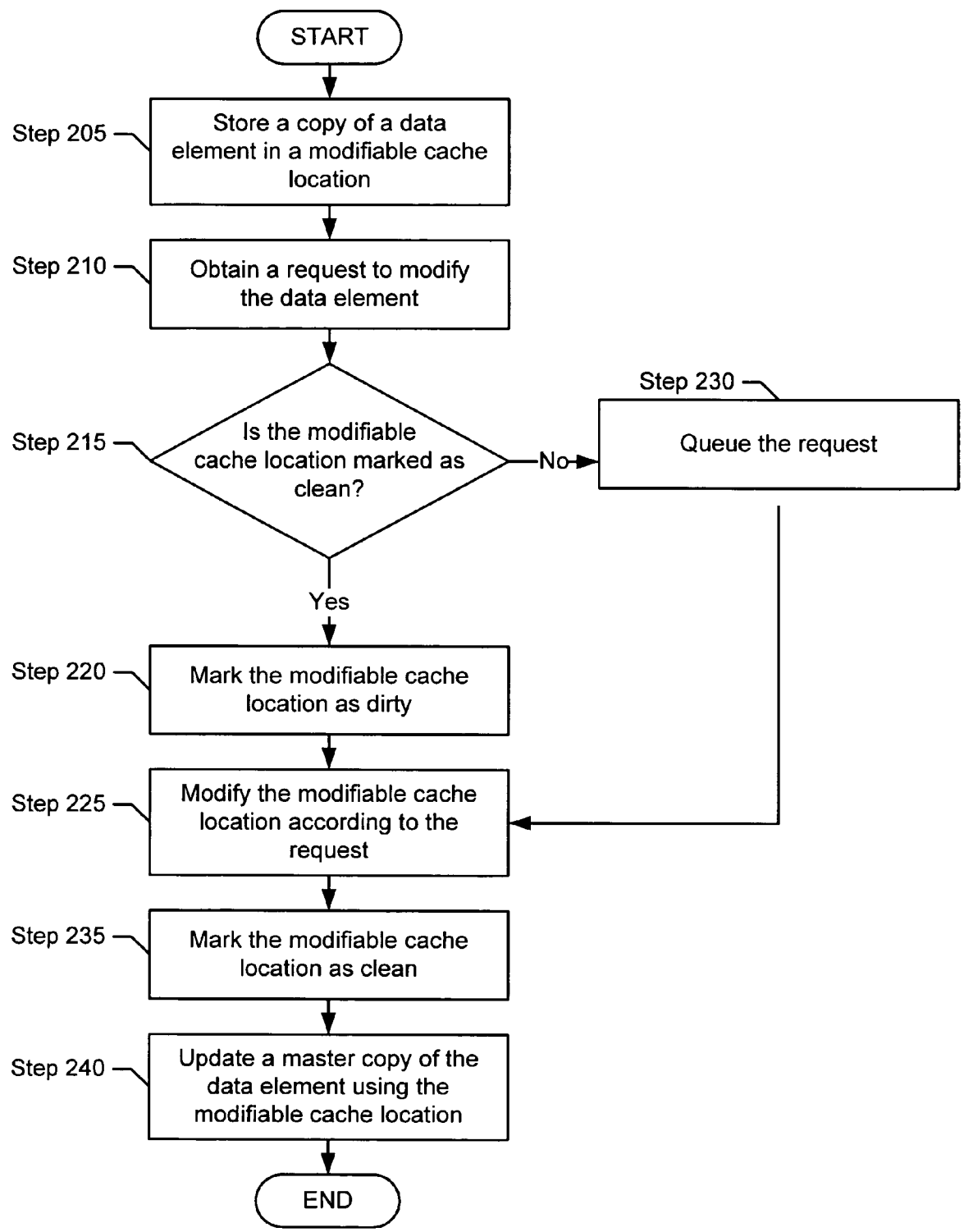
FIGS. 2-3 show flowcharts in accordance with one or more embodiments of the invention.

FIG. 2 shows a diagram of a flowchart in accordance with one or more embodiments of the invention. Specifically, FIG. 2 shows a diagram of a method for modifying a data element in accordance with one or more embodiments of the invention. In one or more embodiments of the invention, one or more of the steps shown in FIG. 2 may be omitted, repeated, and/or performed in a different order. Accordingly, the specific arrangement of steps shown in FIG. 2 should not be construed as limiting the scope of the invention.

In one or more embodiments of the invention, in Step 205, a copy of a data element is stored in a modifiable cache location. Specifically, a master copy of the data element may be used as a source for the copy of the data element stored in the modifiable cache location. In one or more embodiments of the invention, the copy of the data element is stored in the modifiable cache location once a request to access (i.e., read or modify) the data element is received. Alternatively, the copy of the data element may be stored in the modifiable cache location as part of a pre-caching routine, predictive caching, or any other similar type of caching mechanism.

Further, as discussed above with respect to FIG. 1B, the modifiable cache location may be associated with a cache location status marker indicating whether the modifiable cache location is dirty (i.e., currently locked by an execution thread) or "clean" (i.e., available for modification by an execution thread). In one or more embodiments of the invention, if the copy of the data element is stored in the modifiable cache location as a result of a request to read the data element, the cache location status marker initially indicates that the modifiable cache location is clean. Alternatively, if the copy of the data element is stored in the modifiable cache location as a result of a request to modify the data element, the cache location status marker initially indicates that the modifiable cache location is dirty.

In one or more embodiments of the invention, in Step 210, a request to modify the data element is obtained. Specifically, the request may be associated with one of multiple execution threads in a multithreaded environment. Further, the request may be obtained by a data manager (e.g., data manager (115) of FIG. 1A) configured to manage access to the data element.

In one or more embodiments of the invention, in Step 215, a determination is made of whether the modifiable cache location is clean. Said another way, a determination is made of whether the modifiable cache location is available to be modified. In one or more embodiments of the invention, the determination is made by referencing a cache location status marker associated with the modifiable cache location.

If the modifiable cache location is marked as clean, then in Step 220, the modifiable cache location is marked as dirty. Specifically, by marking the modifiable cache location as dirty, no other execution threads are allowed to access the modifiable cache location until the modifiable cache location is marked as clean. Accordingly, marking the modifiable cache location as dirty prevents other execution threads from reading incomplete or corrupt data from the modifiable cache location. After the modifiable cache location is marked as dirty, in Step 225, the modifiable cache location is modified according to the request obtained in Step 210. In Step 235, the modifiable cache location is subsequently marked as clean.

In one or more embodiments of the invention, if the modifiable cache location is already marked as dirty (i.e., as determined in Step 215), the request obtained in Step 210 is queued. Specifically, the fact that the modifiable cache location is marked as dirty indicates that the modifiable cache location is currently being modified according to another request. Therefore, the modifiable cache location cannot be modified according to the request obtained in Step 210 until the current modification is complete. In one or more embodiments of the invention, as shown in FIG. 2, once the current modification is complete, the queued request may be handled before the modifiable cache location is marked as clean. Alternatively (not shown in FIG. 2), the modifiable cache location may marked as clean prior to handling the queued request. Accordingly, prior to handling the queued request, the modifiable cache location may be marked as dirty again.

In one or more embodiments of the invention, in Step 240, the master copy of the data element is updated using the copy of the data element stored in the modifiable cache location. In one or more embodiments of the invention, the master copy of the data element is updated once the modifiable cache location is marked as clean. Alternatively, the master copy of the data element may be updated at regular intervals (dependent on the modifiable cache location being marked as clean), in response to an explicit update instruction (e.g., a "save" instruction associated with a software application), or based on any other similar criteria.

Figure 3:
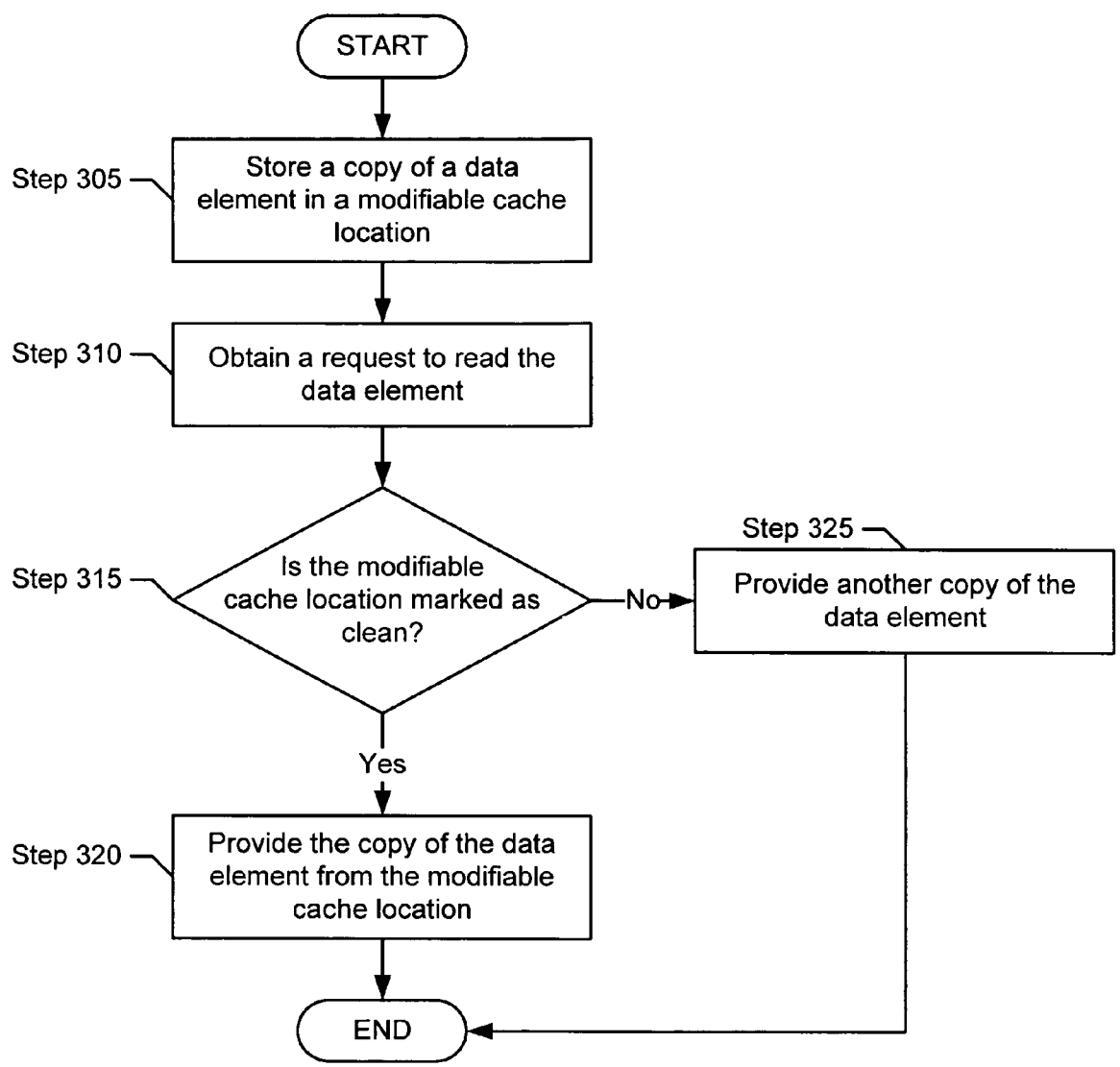

FIG. 3 shows a flowchart in accordance with one or more embodiments of the invention. Specifically, FIG. 3 shows a flowchart of a method for reading a data element in accordance with one or more embodiments of the invention. In one or more embodiments of the invention, one or more of the steps shown in FIG. 3 may be omitted, repeated, and/or performed in a different order. Accordingly, the specific arrangement of steps shown in FIG. 3 should not be construed as limiting the scope of the invention.

In one or more embodiments of the invention, in Step 305, a copy of a data element is stored in a modifiable cache location. Specifically, a master copy of the data element may be used as a source for the copy of the data element stored in the modifiable cache location. In one or more embodiments of the invention, the copy of the data element is stored in the modifiable cache location once a request to access the data element is received. Alternatively, the copy of the data element may be stored in the modifiable cache location as part of a pre-caching routine, predictive caching, or any other similar type of caching mechanism.

Further, as discussed above with respect to FIG. 1B, the modifiable cache location may be associated with a cache location status marker indicating whether the modifiable cache location is dirty (i.e., currently locked by an execution thread) or "clean" (i.e., available for modification by an execution thread). In one or more embodiments of the invention, if the copy of the data element is stored in the modifiable cache location as a result of a request to read the data element, the cache location status marker initially indicates that the modifiable cache location is clean. Alternatively, if the copy of the data element is stored in the modifiable cache location as a result of a request to modify the data element, the cache location status marker initially indicates that the modifiable cache location is dirty.

In one or more embodiments of the invention, in Step 310, a request to read the data element is obtained. Specifically, the request may be associated with one of multiple execution threads in a multithreaded environment. Further, the request may be obtained by a data manager (e.g., data manager (115) of FIG. 1A) configured to manage access to the data element.

In one or more embodiments of the invention, in Step 315, a determination is made of whether the modifiable cache location where the copy of the data element is stored is clean. Said another way, a determination is made of whether the modifiable cache location is available to be read. In one or more embodiments of the invention, the determination is made by referencing a cache location status marker associated with the modifiable cache location.

In one or more embodiments of the invention, if the modifiable cache location is marked as clean, then in Step 320, the copy of the data element that is stored in the modifiable cache location is provided in response to the request obtained in Step 310. Alternatively, if the modifiable cache location is marked as dirty, then in Step 325, another copy of the data element may be provided in response to the request. Specifically, another copy of the data element may be made from the master copy of the data element.

In one or more embodiments of the invention, the new copy is provided directly to the requesting execution thread. Alternatively, the new copy may be stored in a read-only cache location (i.e., a cache location separate from the modifiable cache location used in Step 305). The read-only cache location may then be used to service any subsequent requests to read the data element, as long as the modifiable cache location remains marked as dirty. In one or more embodiments of the invention, the read-only cache location is generated only when needed, i.e., when a read request is received while the modifiable cache location is marked as dirty. Further, the read-only cache location may be discarded once the modifiable cache location is marked as clean and any pending read requests are handled.

In one or more embodiments of the invention, providing a read-only copy of the data element (i.e., Step 325) allows execution threads to read the data element even while the data element is being modified. Further, if queued modification requests are all handled before the modifiable cache location is marked as clean, data modification may occur faster than if read requests are handled between queued modification requests. In such cases, read requests do not impede the progress of execution threads requesting modification of the data element. Therefore, embodiments of the invention may result in faster handling of read and modify requests when multiple threads are requesting access to the same data element.

Specifically, embodiments of the invention allow for faster handling of read and modify requests in a variety of multithreaded environments. For example, some directory service systems, such as Lightweight Directory Access Protocol (LDAP), rely on loose consistency. Loose consistency means that a request to modify a data element may be considered successful before the modification is propagated to all instances of the data element. In contrast, tight consistency means that a modification request is not considered successful until all instances of the data element are updated.

When relying on loose consistency (e.g., in an LDAP directory service system), because there is no assurance that a given instance of the data element has the most recent value, rapid propagation of modifications to all active instances of a data element is generally a priority. Embodiments of the invention allow modifications to be written to data elements without being impeded by concurrent read requests. Meanwhile, the use of read-only cache locations allows read requests to be handled even while data elements are being modified. In this manner, the speed of data propagation may be increased when relying on loose consistency, with minimal impact on read access speed.

Figure 4A:
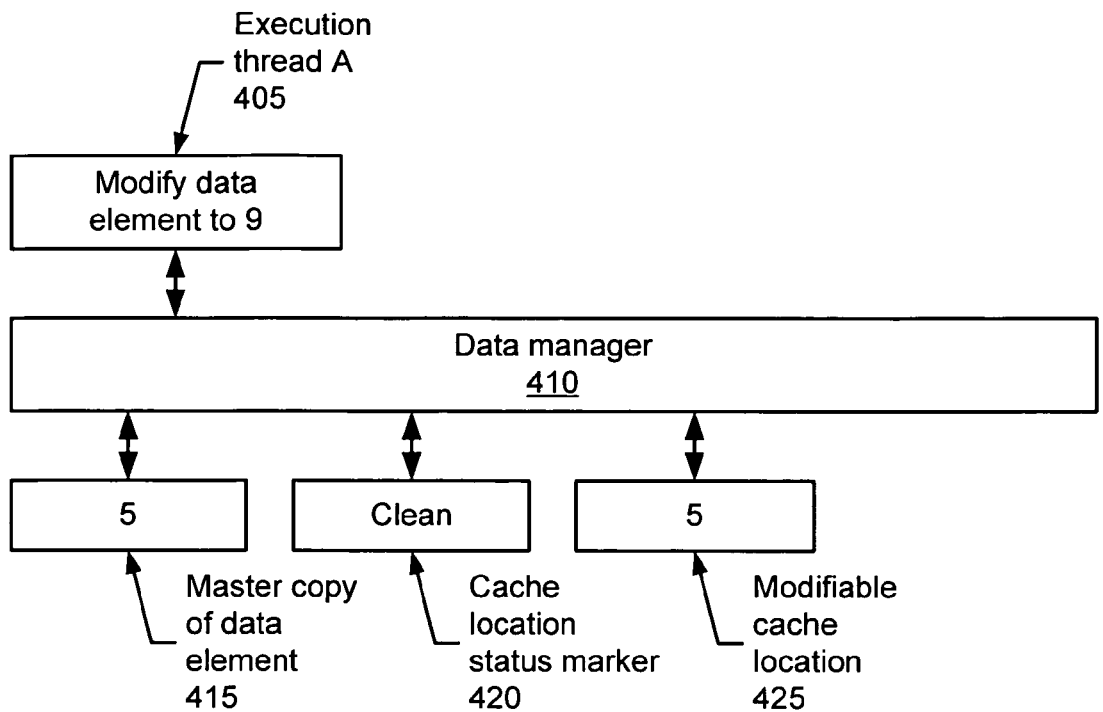
FIGS. 4A-4E show diagrams of an example of managing access to a data element in accordance with one or more embodiments of the invention.
Figure 4B:
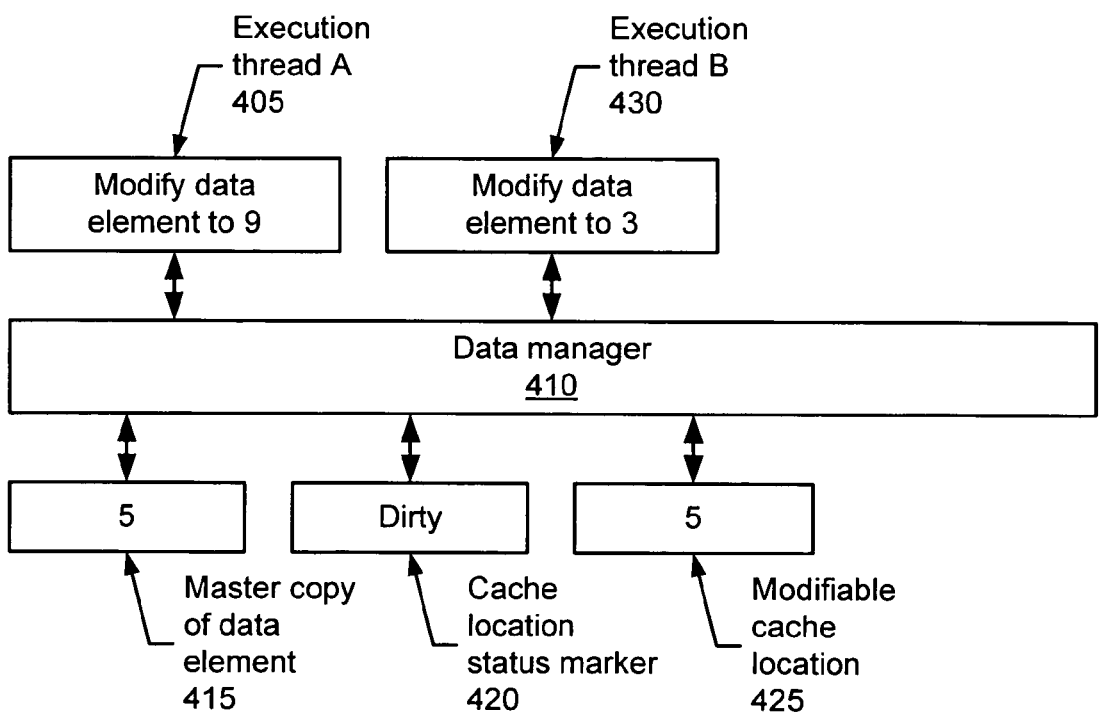

FIGS. 4A-4B show diagrams of an example of managing access to a data element in accordance with one or more embodiments of the invention. Those skilled in the art will appreciate that FIGS. 4A-4B are provided for exemplary purposes only and should not be construed as limiting the scope of the invention.

In this example, as shown in FIG. 4A, a data manager (410) is configured to manage access to a data element by maintaining a master copy of the data element (415), a modifiable cache location (425) storing a copy of the data element, and a cache location status marker (420) indicating a status of the modifiable cache location (425). Initially, as shown in FIG. 4A, the value of the data element is "5", and the cache location status marker (420) indicates that the modifiable cache location (425) is clean, i.e., that the modifiable cache location (425) is not currently being modified.

Further, FIG. 4A shows execution thread A (405) requesting to modify the value of the data element to "9". Consequently, as shown in FIG. 4B, the cache location status marker (420) is updated to reflect that the modifiable cache location (425) is dirty, i.e., that the modifiable cache location (425) is currently being modified. In addition, FIG. 4B shows execution thread B (430) requesting to modify the value of the data element to "3". Because the modifiable cache location (425) is marked as dirty, the request from execution thread B (430) is queued.

Figure 4C:
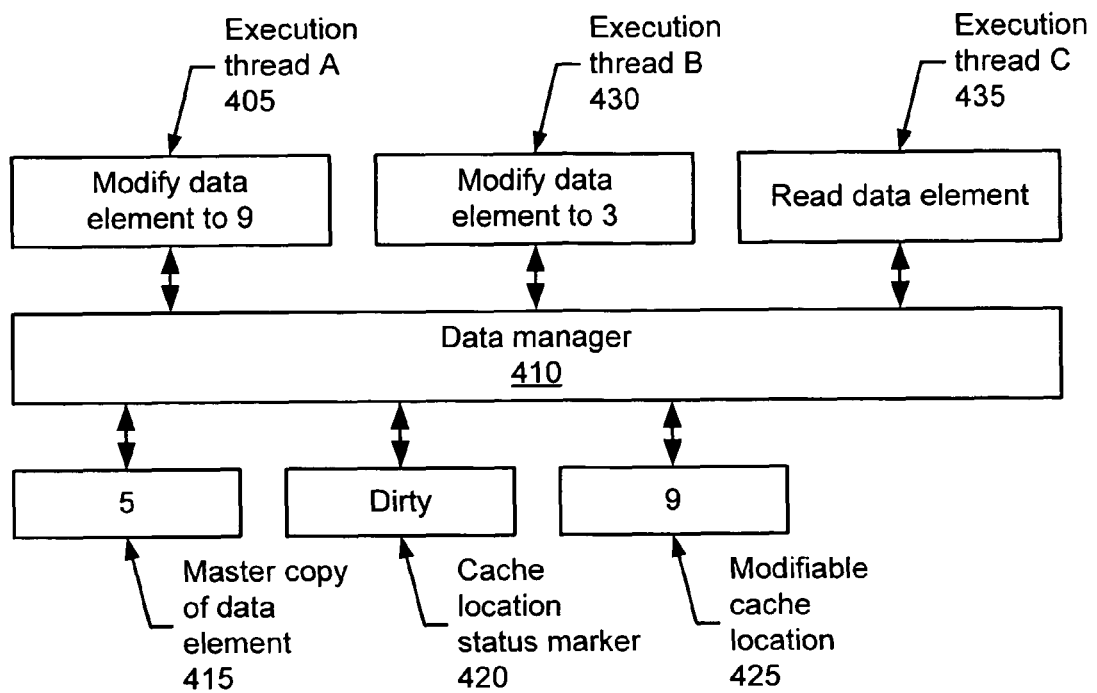

In FIG. 4C, the modifiable cache location (425) has been modified to reflect the new value of the data element according to the request from execution thread A (405). At this point, because a request from execution thread B (430) is queued, the modifiable cache location (425) is not yet marked as clean. Alternatively, in one or more embodiments of the invention, the modifiable cache location (425) is marked as clean prior to handling each queued request.

Figure 4D:
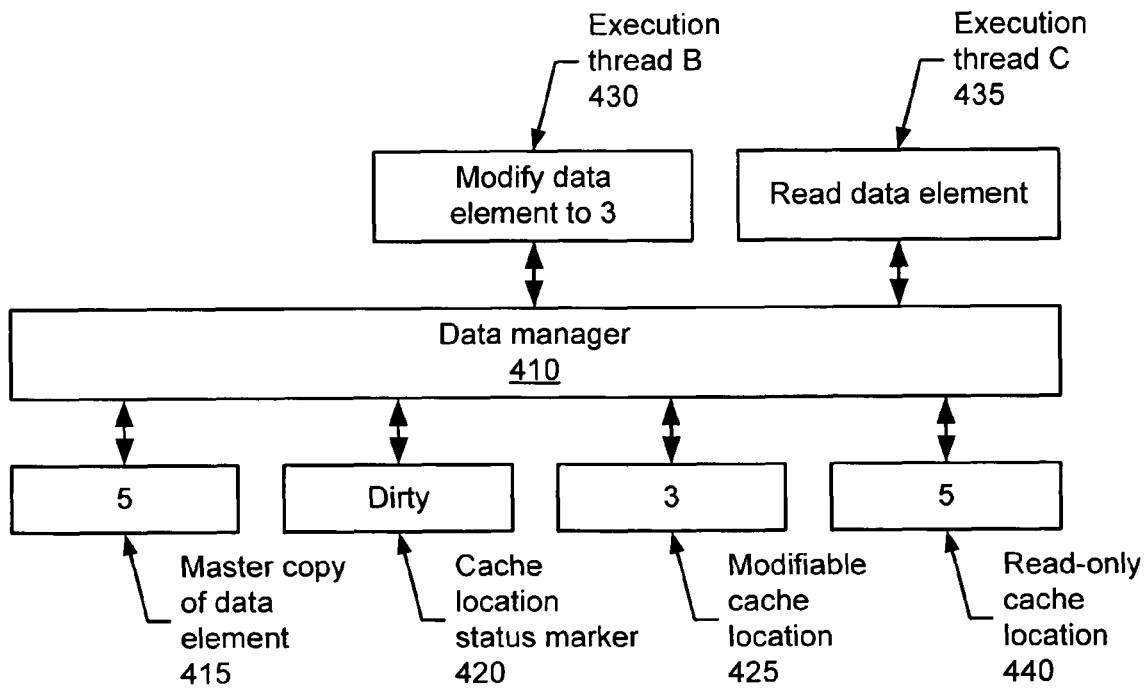

Further, FIG. 4C shows execution thread C (435) requesting to read the data. Because the modifiable cache location (425) is marked as dirty, in FIG. 4D, a read-only cache location (440) is created to store another copy of the data element. Specifically, the read-only cache location (440) is created using the value stored in the master copy of the data element (415), in this case "5". Once created, the read-only cache location (440) is used to handle the read request from execution thread C (435). In addition, as shown in FIG. 4D, the modifiable cache location (425) is updated according to the request from execution thread B (430). Execution thread A (405) is not shown in FIG. 4D because the request issued by execution thread A (405) has been handled. If another modify request is issued by execution thread A (405) before the request from execution thread B (430) has been handled, the new request is queued.

Figure 4E:
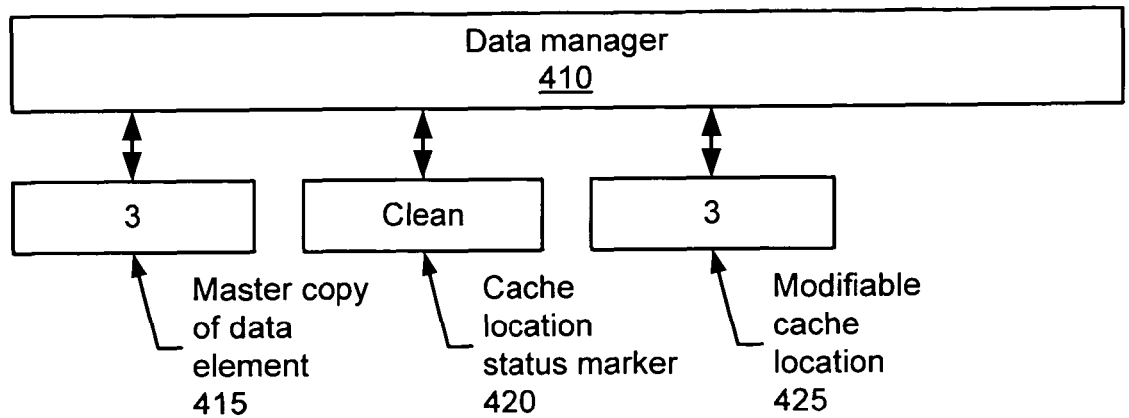

In FIG. 4E, all requests to read or modify the data element have been handled. Accordingly, the cache location status marker (420) is updated to reflect that the modifiable cache location (425) is clean, and the read-only cache location (440) is discarded. Further, the value of the data element stored in the modifiable cache location (425), i.e., the value according to the most recent request, is written back into the master copy of the data element (415). In one or more embodiments of the invention, unless the modifiable cache location (425) is again marked as dirty, subsequent requests to read the data element are handled by providing the copy of the data element stored in the modifiable cache location (425).

Figure 5:
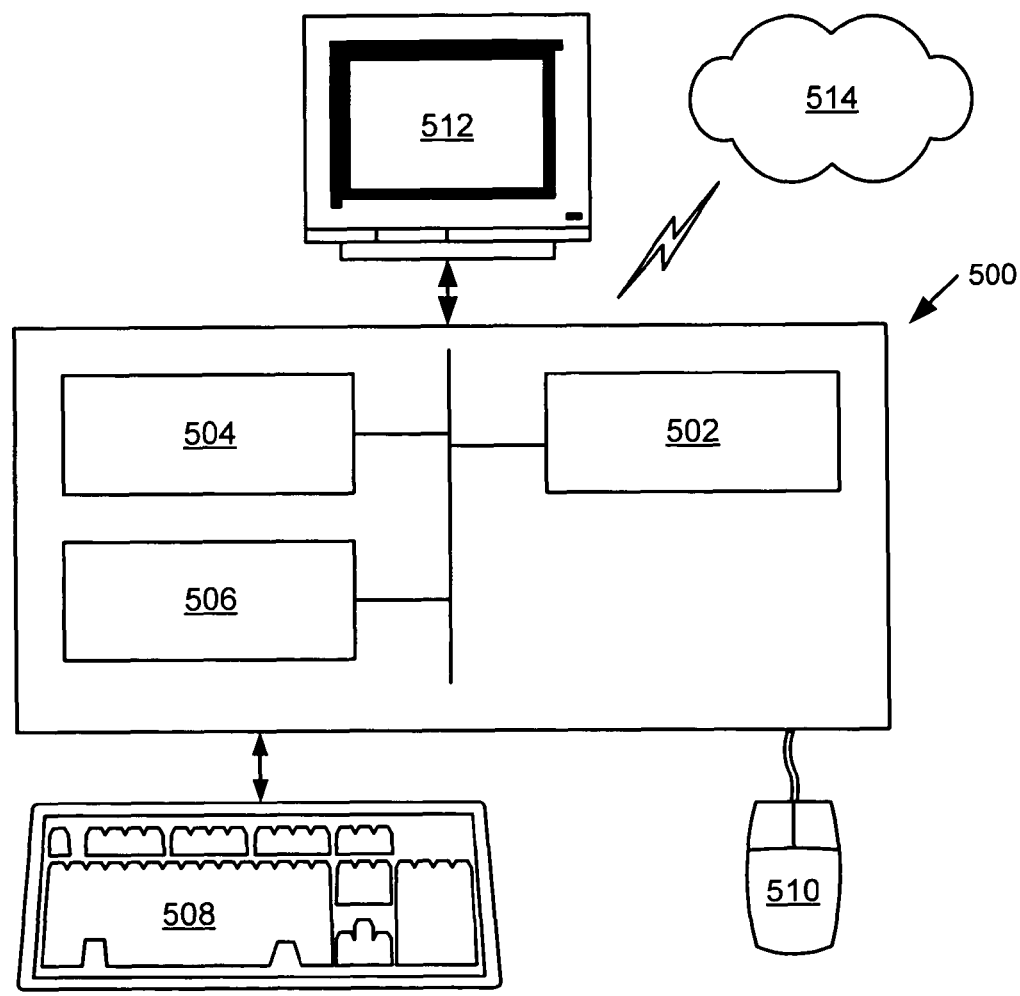
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., execution thread, data manager, master copy of a data element, cache location(s), cache location status marker, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing access to a data element, comprising:
   storing a first copy of the data element in a first cache location;
   obtaining a first request to modify the data element, wherein the first request to modify the data element is associated with a first execution thread;
   marking the first cache location as dirty based on the first request to modify the data element;
   modifying the first cache location according to the first request to modify the data element once the first cache location is marked as dirty;
   obtaining a first request to read the data element, wherein the first request to read the data element is associated with a second execution thread, and wherein the first request to read the data element is obtained after the modifying begins and before the modifying is complete;
   determining, in response to obtaining the first request to read the data element, that the first cache location is marked dirty;
   creating, in response to the determination that the first cache location is marked dirty, a second copy of the data element;

storing the second copy of the data element in a second cache location;

providing, to the second execution thread, read access to the second cache location;

obtaining a second request to modify the data element while the first cache location is marked as dirty;

queuing the second request to modify the data element until modifying the first cache location according to the first request to modify the data element is complete;

modifying the first cache location according to the second request to modify the data element once modifying the first cache location according to the first request to modify the data element is complete; and marking the first cache location as clean after modifying the first cache location is complete.

2. The method of claim 1, further comprising:

obtaining a second request to modify the data element while the first cache location is marked as clean; and providing the first copy of the data element in response to the second request to read the data element based on the first cache location being marked as clean.

3. The method of claim 1, further comprising:

obtaining a second request to read the data element, wherein the second request to read the data element is associated with a third execution thread;

providing the first copy of the data element in response to the second request to read the data element when the first cache location is marked as clean; and providing a third copy of the data element in response to the second request to read the data element when the first cache location is marked as dirty.

4. The method of claim 1, further comprising:

updating a master copy of the data element using the first cache location after modifying the first cache location according to the first request to modify the data element is complete.

5. The method of claim 1, further comprising:

discarding the second cache location once all requests to read the data element are handled.

6. The method of claim 1, wherein marking the first cache location as dirty and marking the first cache location as clean comprise modifying a Boolean variable.

7. The method of claim 1, wherein marking the first cache location as dirty and marking the first cache location as clean are performed by one selected from a group consisting of an operating system, a file system, a volume manager, and a storage device driver.

8. The method of claim 1, wherein the first cache location comprises a location in random access memory.

9. The method of claim 1, wherein storing the first copy of the data element in the first cache location is performed in response to the first request to modify the data element.

10. A system comprising:

a first cache location storing a first copy of a data element;

a second cache location; and a data manager configured to:

obtain a first request to modify the data element, wherein the first request to modify the data element is associated with a first execution thread;

mark the first cache location as dirty based on the first request to modify the data element;

modify the first cache location according to the first request to modify the data element once the first cache location is marked as dirty;

obtain a first request to read the data element, wherein the first request to read the data element is associated with a second execution thread, and wherein the first request to read the data element is obtained after the modifying begins and before the modifying is complete;

determine, in response to obtaining the first request to read the data element, that the first cache location is marked dirty;

create, in response to the determination that the first cache location is marked dirty, a second copy of the data element; store the second copy of the data element in the second cache location;

provide, to the second execution thread, read access to the second cache location;

obtain a second request to modify the data element while the first cache location is marked as dirty, queue the second request to modify the data element until modifying the first cache location according to the first request to modify the data element is complete, and modify the first cache location according to the second request to modify the data element once modifying the first cache location according to the first request to modify the data element is complete; and mark the first cache location as clean after modifying the first cache location is complete.

11. The system of claim 10, wherein the data manager is further configured to:

obtain a second request to read the data element, wherein the second request to read the data element is associated with a third execution thread, provide the first copy of the data element in response to the second request to read the data element when the first cache location is marked as clean, and provide a third copy of the data element in response to the second request to read the data element when the first cache location is marked as dirty.

12. The system of claim 10, wherein the data manager is further configured to:

update a master copy of the data element using the first cache location after modifying the first cache location according to the first request to modify the data element is complete.

13. The system of claim 10, wherein the data manager is further configured to:

discard the second cache location once all requests to read the data element are handled.

14. The system of claim 10, wherein marking the first cache location as dirty and marking the first cache location as clean comprise modifying a Boolean variable.

15. The system of claim 10, wherein the data manager comprises one selected from a group consisting of an operating system, a file system, a volume manager, and a storage device driver.

16. A computer readable medium comprising executable instructions for managing access to a data element by:

storing a first copy of the data element in a first cache location;

obtaining a first request to modify the data element, wherein the first request to modify the data element is associated with a first execution thread;

marking the first cache location as dirty based on the first request to modify the data element;

modifying the cache location according to the first request to modify the data element once the first cache location is marked as dirty;

obtaining a first request to read the data element, wherein the first request to read the data element is associated with a second execution thread, and wherein the first request to read the data element is obtained after the modifying begins and before the modifying is complete;

determining, in response to obtaining the first request to read the data element, that the first cache location is marked dirty;

creating, in response to the determination that the first cache location is marked dirty, a second copy of the data element;

storing the second copy of the data element in a second cache location;

providing, to the second execution thread, read access to the second cache location;

obtaining a second request to modify the data element while the first cache location is marked as dirty;

queuing the second request to modify the data element until modifying the first cache location according to the first request to modify the data element is complete;

modifying the first cache location according to the second request to modify the data element once modifying the first cache location according to the first request to modify the data element is complete; and marking the cache location as clean after modifying the first cache location is complete.

* * * * *